United States Patent [19]

McCombie et al.

[11] 4,180,194
[45] Dec. 25, 1979

[54] WEB TRANSPORT MECHANISM AND METHOD

[75] Inventors: Alan K. McCombie; Stephen Temple, both of Cambridge, England

[73] Assignee: Cambridge Consultants of Bar Hill, Cambridge, England

[21] Appl. No.: 866,003

[22] Filed: Dec. 30, 1977

[51] Int. Cl.$^2$ ............................................. B65H 17/42
[52] U.S. Cl. ................................................... 226/113
[58] Field of Search ............... 226/112, 114, 55, 1, 226/4; 352/184

[56] References Cited

U.S. PATENT DOCUMENTS

| | | | |
|---|---|---|---|
| 3,214,233 | 10/1965 | Persidsky | 352/184 |
| 3,446,554 | 5/1969 | Hitchcock | 226/113 X |
| 3,494,524 | 2/1970 | Jones | 226/113 X |
| 3,600,073 | 8/1971 | Shaw | 226/113 X |
| 3,794,415 | 2/1974 | Jones | 226/113 X |
| 4,039,256 | 8/1977 | Teeple | 226/113 X |

*Primary Examiner*—Richard A. Schacher
*Attorney, Agent, or Firm*—Lerner, David, Littenberg & Samuel

[57] ABSTRACT

A rolling loop camera has a rotor which is arranged to clamp successive frames of the film against the surface of a fiber optic device. The rotor comprises a number of clamping devices with gaps between them, which devices roll over the film on the said surface. The gaps between the clamping devices receive the film which has been formed into a loop by supply means and the movement of the rotor causes the loop to roll across the said surface, thus placing the next frame on the surface for exposure. The film between the supply means and the loop is essentially supported by only the resilience of the film, and thus sliding of the film along a stationary surface while the loop is being formed is avoided. Each clamping device comprises a group of rollers and may include a belt supported by the rollers. As the rotor is operated, the clamping devices move around an endless path which in one embodiment is circular and in another embodiment is oval. A track defining the path is provided, and the clamping devices are maintained in engagement with the track by a drive member which causes the devices to roll along the track, thereby causing rotation of the rotor. The invention is applicable also to film projectors, in which case locator means is preferably provided for ensuring correct registration of the film frames in the device.

42 Claims, 14 Drawing Figures

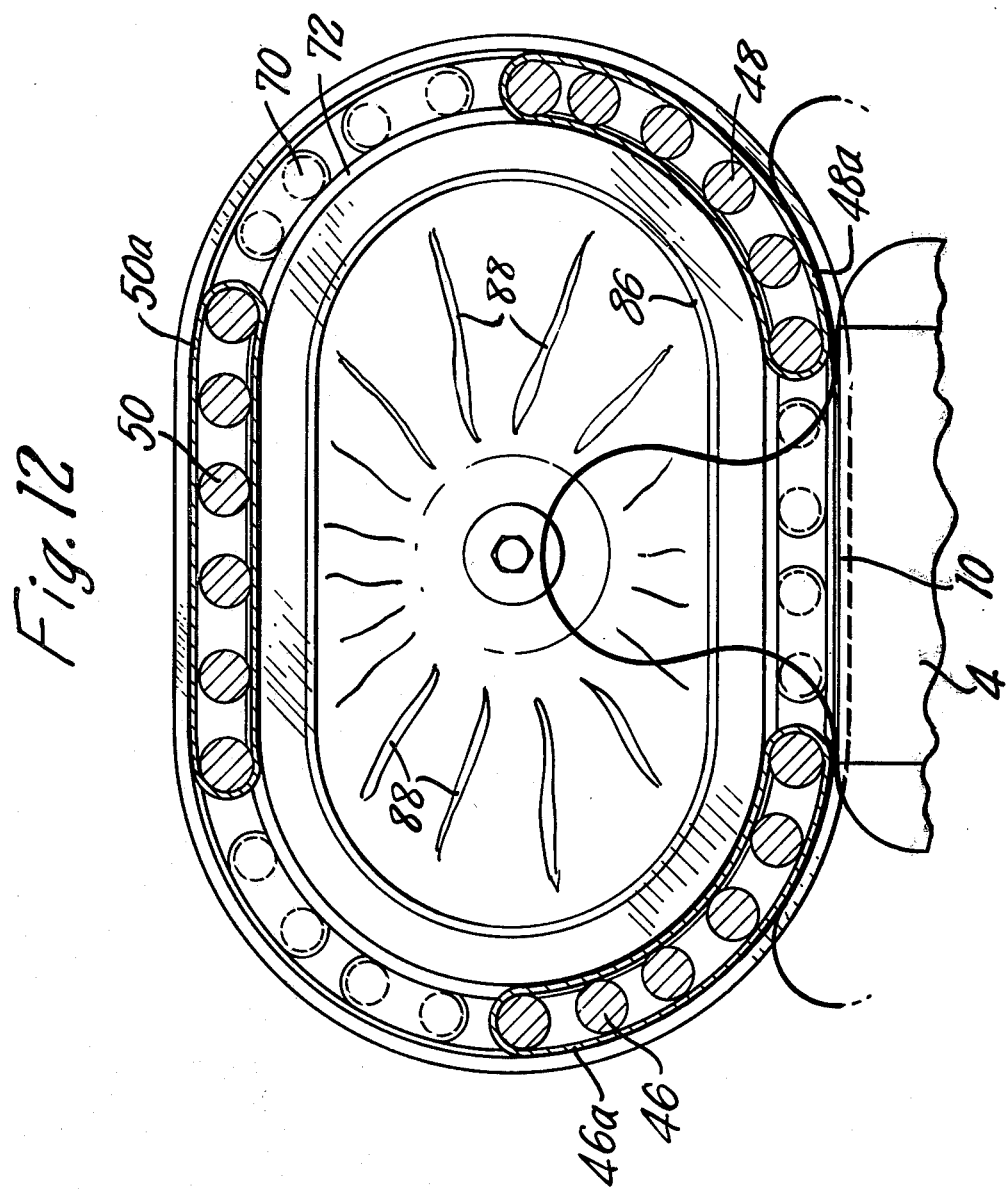

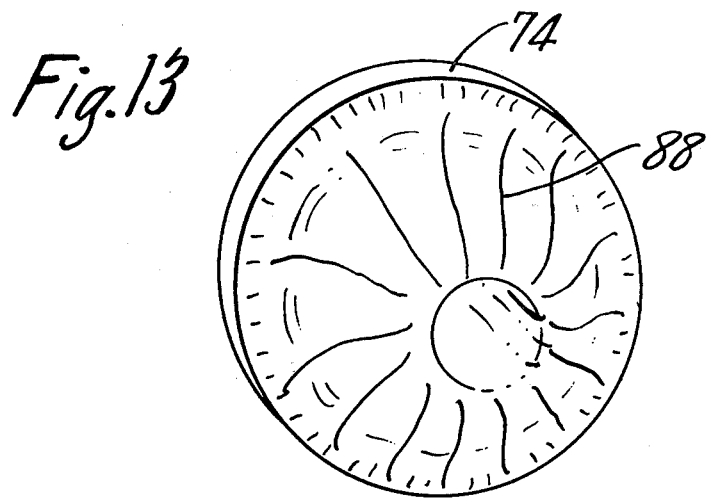
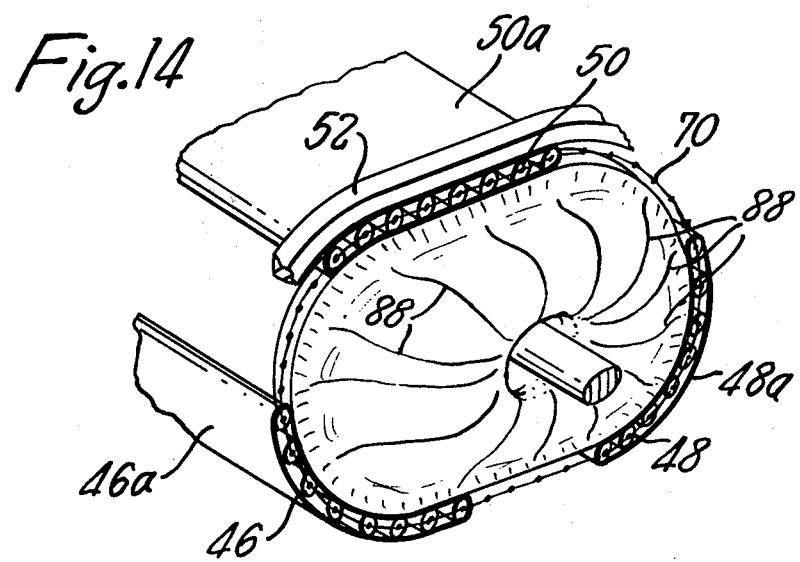

WEB TRANSPORT MECHANISM AND METHOD

This invention relates to a web transport mechanism, and particularly discloses camera apparatus for rolling in and clamping a film recording material onto a fibre optic faceplate during the image recording process.

Hitherto, film transport mechanisms have consisted of two intermittent drives, one of which moves the film longitudinally while the other operates a clamping plate acting perpendicular to the film plane. Such mechanisms are complex, produce shock and vibration, and are limited in operating speed. They also involve the film in a sliding motion over or between stationary surfaces, which may cause scuffing of the film and degrade the picture quality or damage the mechanism by deposition of emulsion particles. Alternatively a rolling film transport mechanism has been proposed in which a loop of film formed in a gap in a moving surface is used to advance the film by one frame over a stationary aperture, the film being located to prevent motion relative to the stationary aperture during recording by pins projecting through perforations in the film. This mechanism has the known advantage of avoiding mechanical reciprocation in its component parts, but still exhibits sliding motion of the film over the stationary surface during the periods of increase and decrease in the size of the film loop. Further the rolling loop mechanism is not able by virtue of its construction to clamp the film onto the image aperture with intimate contact. Details of such mechanism may be found in U.K. Patent Specification Nos. 1171248 and 1278536.

It is an object of a preferred form of the present invention to disclose a rolling loop film transport mechanism, by use of which it is possible to avoid the sliding motions and the resulting scuffing of the film. This is achieved in a preferred embodiment of the invention by laying the film onto the image aperture in the rolling loop film transport mechanism by the action of a roller, or rollers or by means of a rolling surface, moving in contact with the stationary surface.

In another preferred form the invention provides means to press the film with a positive pressure against the aperture plate, said means preferably comprising of a plurality of small rollers or other elements having a rolling surface which press the stationary film onto the image aperture during the period of image formation. This has been found convenient for application in cameras which use a fibre optic face plate, where the proximity of the recording film to the face plate is a significant factor in the image resolution. It is a further object to eliminate the use of perforations in the recording film.

In one preferred aspect of the present invention, there is provided a rolling loop film transport mechanism, in which during at least part of its travel the rolling loop is maintained at a constant size. Preferably this is achieved by employing clamping members which clamp the ends of the loop relative to a stationary surface during the period that the loop is maintained at constant size. Such clamping means is preferably comprised of spaced apart clamping members between which the loop is located, each clamping member having a rolling surface co-operating with the stationary surface to effect said clamping. According to a preferred embodiment of the present invention there is provided a film transport mechanism for transporting film through a zone in which successive portions of said film are to be intermittently held stationary; comprising:

supply means for continuously supplying film to an input side of said zone;

take-up means for continuously removing film from an output side of said zone;

a film support member having a surface in said zone at a position at which said successive portions of said film are to be held stationary; and a plurality of clamping members spaced apart from each other and movable continuously around an endless path so as to co-operate during successive intermittent intervals with said support member surface to clamp said film portions at said position, each said clamping member having a clamping surface which is arranged to roll across said film at said position to achieve said clamping substantially without sliding movement between said film and said clamping surface and the arrangement being such that during each clamping interval said film supplied to said input side of said zone by said continuously operating supply means may be formed into a first loop in the space between the operative clamping member and the clamping member to be next operative, and that, in the period between said clamping intervals, the movement of said clamping members transfers film in said first loop to said position for clamping, and transfers the previously clamped film from said position to said output side of said zone in the form of a second loop from which said continuously operating take-up means removes film from said zone. Preferably each clamping member comprises a roller or group of rollers, or a belt, supported by rollers and preferably drive means is provided to effect said rolling of said clamping surface. The endless path may be circular, in which case the surface of the film support member is preferably also arcuate and concentric with the endless path. Alternatively, the endless path may be in any other shape, and the support surface correspondingly shaped, for example it may be plane and the portion of the path of the clamping member which is adjacent the surface would then preferably be straight.

According to another preferred aspect of the present invention, a rolling loop film transport mechanism for an image recording camera comprises a stationary surface forming an arc of a cylinder, a sector of which contains an image aperture, a rotor also generally cylindrical, mounted centrally and rotatably with respect to the stationary surface, the periphery of the rotor containing a plurality of spaces or recesses symmetrically disposed around the rotor and separated by a somewhat greater arc than the said stationary surface, each side of each recess having one roller at least housed in said rotor and configured to roll on the said surface as the rotor rotates, and first and second film means, the length of recording film being threaded between the arcuate surface and contiguous rollers and forming in the image recording position two loops of film housed in the adjacent recesses in the rotor adjacent respective film feed means; the mechanism operative, as the rotor rotates, to roll the film loop present in one recess, by action of the rollers moving across the stationary surface in rolling motion, while the film loops in adjacent recesses are supplied and removed by respective film feed means, thereby to transfer the length of film across the image aperture by one frame for the passage of each recess in the cage without recourse to a sliding action between the film face and the components of the mechanism.

In a further preferred aspect of the invention, the periphery of the cage houses between adjacent recesses symmetrically disposed arrays of closely spaced rollers each configured to roll on said stationary surface as the cage rotates, thereby pressing the recording film against the image aperture in the stationary surface in closely spaced lines of pressure over the cylinder, thereby to press the film into intimate contact with the image aperture.

In a further aspect of the invention the image recording camera contains a fibre optic face plate, for example of an image intensifier, in the image aperture and through intimate contact of the film with the face plate, provides a recording resolution corresponding to the image quality of the face plate.

In a further aspect the invention includes film feed means whose feed velocity varies in a cyclic manner, and is temporarily held to or close to zero at the time when the film loops begin or end their rolling motion over said stationary surface, thereby to eliminate a scuffing action at the beginning or the end of the loop rolling period which may occur for example with constant film feed devices.

The invention is described further by way of example with reference to the generally diagrammatic accompanying drawings in which:

FIG. 12 is a section on the line XII—XII of FIG. 11;

FIG. 13 is a perspective view of a part of the mechanism of FIGS. 11 and 12 prior to assembly of the part in the mechanism; and FIG. 14 is a perspective view, similar to FIG. 13 but showing the part in the shape it assumes when assembled and also showing its relationship with other parts of the mechanism.

Figure 1:
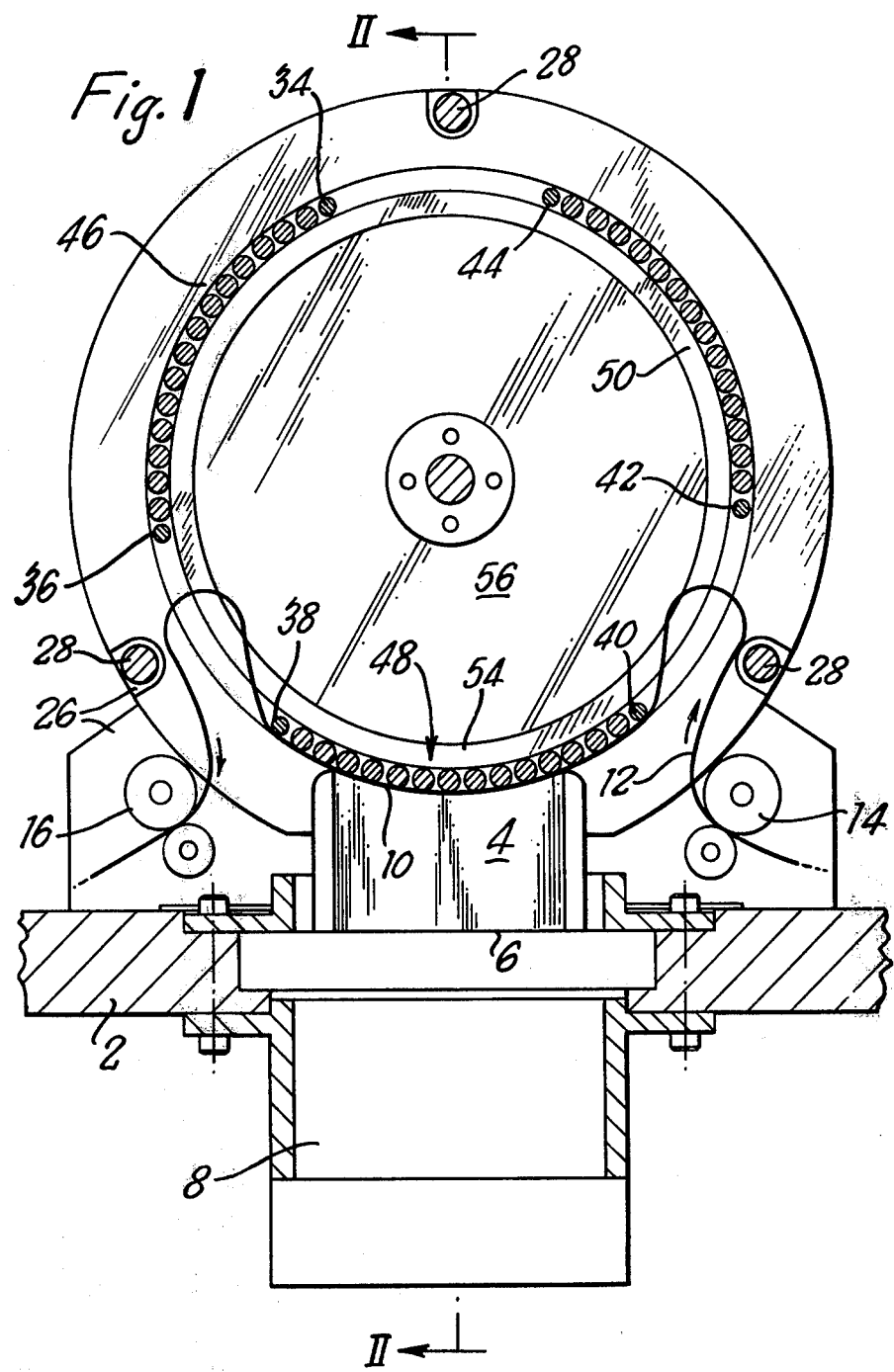
FIG. 1 is a cross section of a film transport mechanism according to a first embodiment of the present invention, and is taken on the line I—I of FIG. 2.
Figure 2:
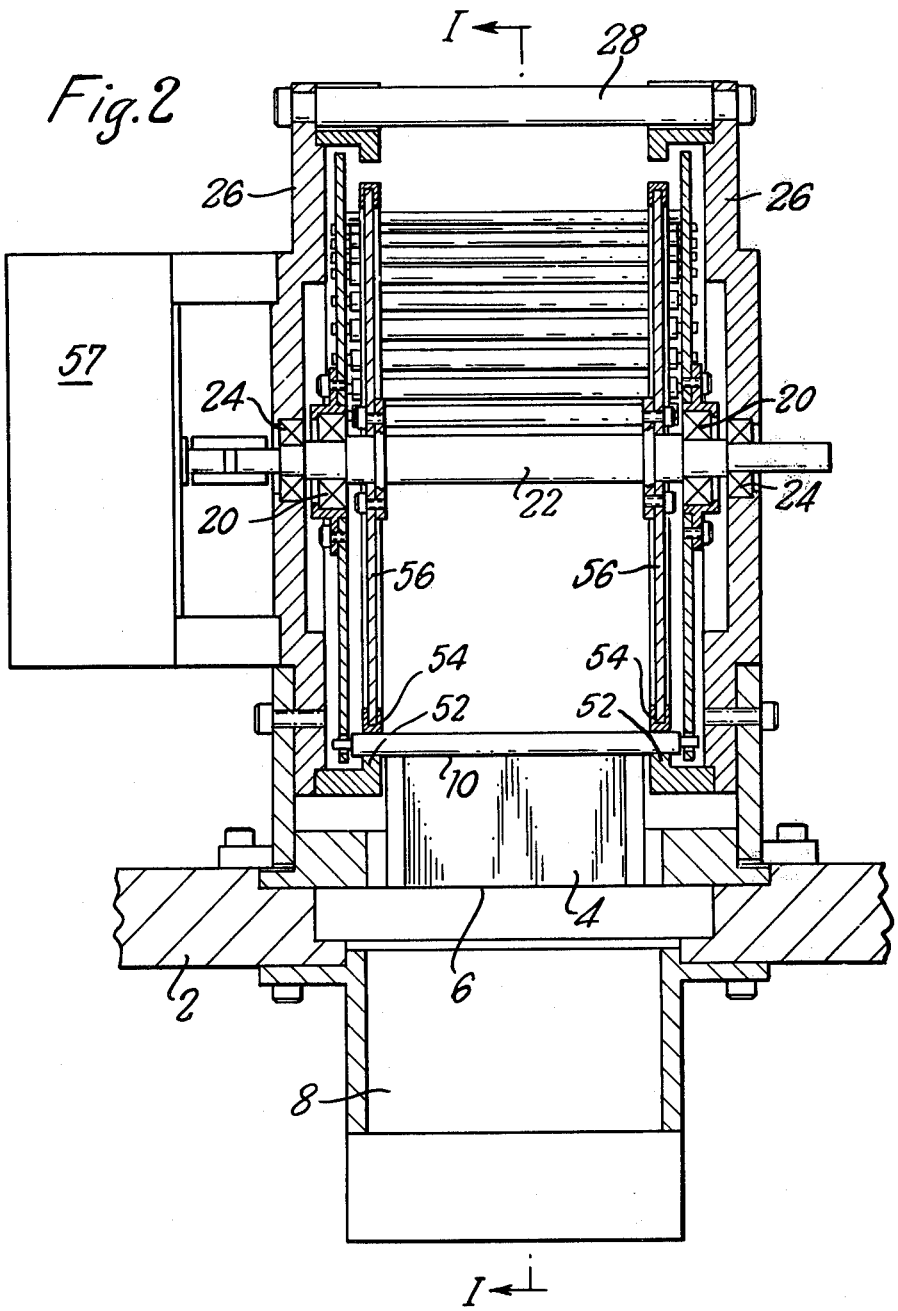
FIG. 2 is an axial section, with parts omitted for clarity, of the mechanism of FIG. 1 and is taken on the line II—II of FIG. 1.
Figure 3:
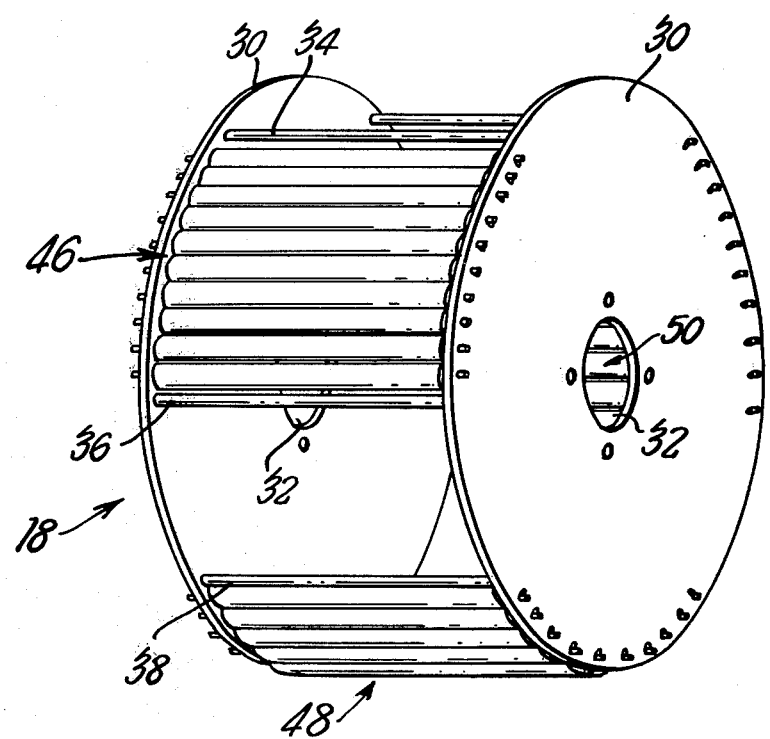
FIG. 3 is a perspective view of a rotor which is included in the mechanism of FIGS. 1 and 2.

With reference to FIGS. 1 to 3, the mechanism shown comprises a housing 2 supporting a fibre optic block 4 having a plane surface 6 for receiving an image to be photographed from an image intensifier and optical system assembly 8 illustrated very diagrammatically in the drawings. The fibre optic block 4 has a concave cylindrical output surface 10 to which images received by the surface 6 are transmitted and onto which successive portions of a film 12, supplied from a continuously operating supply mechanism 14 to a continuously operating take-up mechanism 16, are to be pressed and held stationary for photographing the images transmitted by the fibre optic block 4.

The mechanism for transferring successive portions of the film 12 to the surface 10, and holding such portions stationary on the surface 10 for a period sufficient for the recording of an image on the film, comprises a rotor 18 (see FIG. 3 particularly) which is rotatably supported by bearings 20 on a shaft 22 which itself is rotatably supported by bearings 24 which are mounted in spaced apart wall members 26 of the housing 2. Struts 28 interconnect the wall members 26 to ensure rigidity of the structure. The rotor 18 comprises a pair of axially spaced apart discs 30 apertured at 32 to receive the bearings 20 and rigidly secured to each other by six rods 34, 36, 38, 40, 42 and 44 positioned near to the peripheries of the discs 30. In addition, the rotor 18 includes three roller groups 46, 48 and 50, the group 46 being between the rods 34 and 36, the grup 48 between the rods 38 and 40 and the group 50 between the rods 42 and 44. Each roller group comprises a number (e.g. ten) axially extending rollers supported adjacent the periphery of the discs 30 at equal distances from the centre of rotation of the rotor 18 for both rotary movement and limited radial movement. The rollers in each group are equi-spaced from each other and the arcuate length of each roller group is equal to that of each of the other roller groups and is somewhat greater than the arcuate length of the cylindrical surface 10, which is concentric with the roller groups and shaft 22. Further, the arcuate distance between the rods 36 and 38 is equal to that between the rods 40 and 42 and the rods 44 and 34. The arcuate spacing between the trailing roller of one group and the leading roller of the next group is somewhat less than the arcuate length of the surface 10.

The wall members 26 each carry a circular track 52 concentric with the shaft 22. The rollers of the roller groups 46, 48 and 50 are maintained in engagement with the tracks 52 by resilient tyres 54 carried on the peripheries of spaced apart wheels 56 which are secured to the shaft 22 in alignment with the tracks 52. The shaft 22 is driven by a motor 57 which thus causes the wheels 56 to rotate and such rotation causes, by virtue of frictional engagement between the tyres 54 and the rollers of the groups 46, 48 and 50, such rollers to roll around the track 52, such rolling in turn causing the rotor 18 to rotate about the shaft 22. As a result, the roller groups 46, 48 and 50 are caused to move around a endless circular path which brings them in succession into co-operative relationship with the surface 10, the roller groups and the gaps between them alternately traversing the surface 10. The rods 34, 36 etc are of smaller diameter than the rollers so that the rods do not engage the tracks 52.

Figure 4:
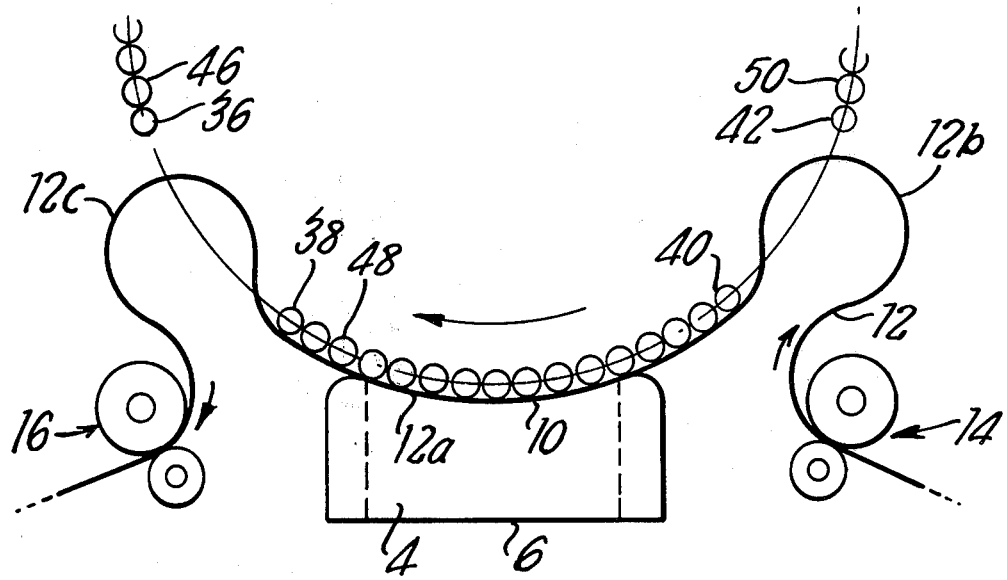
FIGS. 4 to 7 are diagrams showing respectively four different phases in the operation of the mechanism of FIGS. 1 to 3.

The operation of the mechanism can best be understood by reference to FIGS. 4 to 7. FIG. 4 shows the roller group 48 in co-operative relationship with the surface 10, in which position, a portion 12a of the film 12 is trapped between the rollers of group 48 and the surface 10 and is held stationary relative to said surface 10. The positioning of the fibre optic block 6 in relation to the track 52 is such that, even in the absence of any film between the roller groups and the surface 10, there would be a slight spacing between the rollers and the surface 10, this spacing being as near as possible just sufficient to accommodate the thickness of the film 12. Any variation in such thickness can be accommodated by radial movement of the rollers, which is permitted by the resilience of the tyres 54 and the mounting of the rollers on the discs 30. Thus, in FIG. 4, whilst the portion of film 12a is held stationary, the fresh film being supplied by the supply device 14 is formed into a loop 12b at the upstream side of the surface 10 and, under its own resilience, the loop 12b is just beginning to project into the gap between the rods 40 and 42. The take-up device 16 is taking up film from a second loop 12c disposed at the output side of the surface 10. When initially setting the apparatus up and threading the film in this embodiment, it is ensured that there is a sufficient amount of slack in the film between the devices 14 and 16 for the formation of the various loops. In this embodiment of the invention, the supply device 14 and the take-up device 16 are arranged to supply and take up film at the same velocity so that the length of film between these two devices remains constant throughout operation of the apparatus. To ensure this, the supply and take-up devices may be driven by a common motor, for example the motor 57 which also drives the rotor 18.

The period for which the portion of film 12a is held stationary on the surface 10 is determined by both the speed of rotation of the rotor 18 and the amount by which the arcuate length of the roller groups exceeds the arcuate length of the surface 10. During this period, the loop 12b continuously grows, and extends into the gap between the rods 40 and 42 i.e. the gap between roller groups 48 and 50. Also, during this period, the loop 12c continuously decreases as film is removed therefrom by the take-up device 16. While the film portion 12a is in the condition shown in FIG. 4, it is exposed to the image to be photographed.

Figure 5:
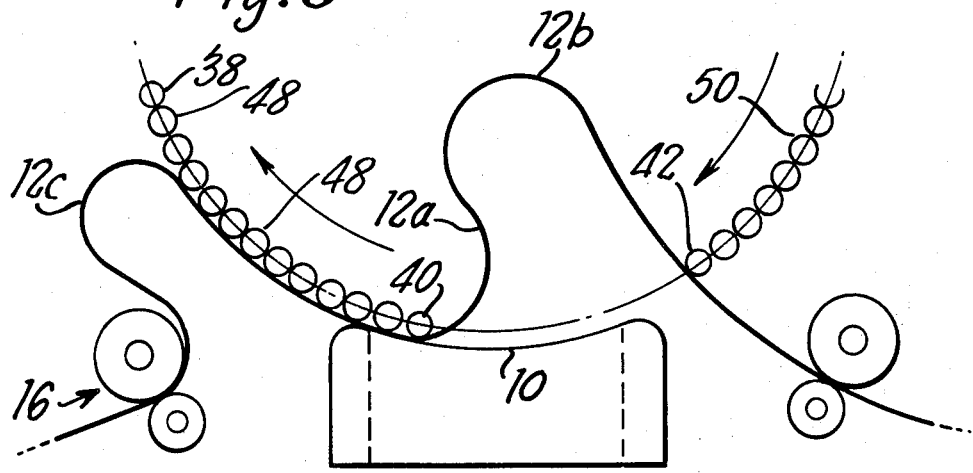

FIG. 5 shows the condition of the film after the roller group 48 has partially left the surface 10 and before the next roller group 50 comes into co-operative relationship with the surface 10. At this time, the loop 12b is being urged towards the left in FIG. 5 by the advancing rod 42 and the portion 12a of the film is gradually being released from the surface 10 as the rollers of group 48 move off to the left. Thus an enlarged loop comprising the film of loop 12b and of the portion 12a is being formed above the surface 10. During this period the loop 12c continues to decrease in size as film is taken up by the take-up device 16.

Figure 6:
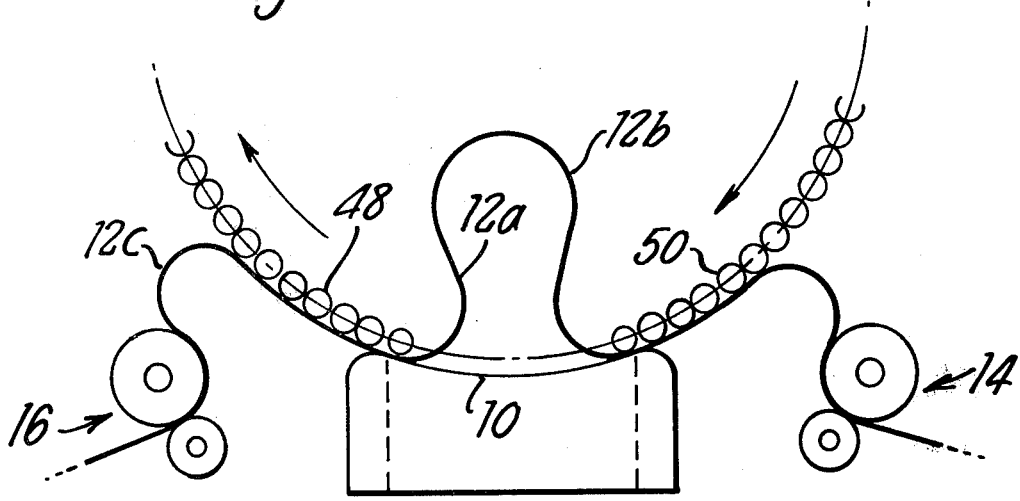
Figure 7:
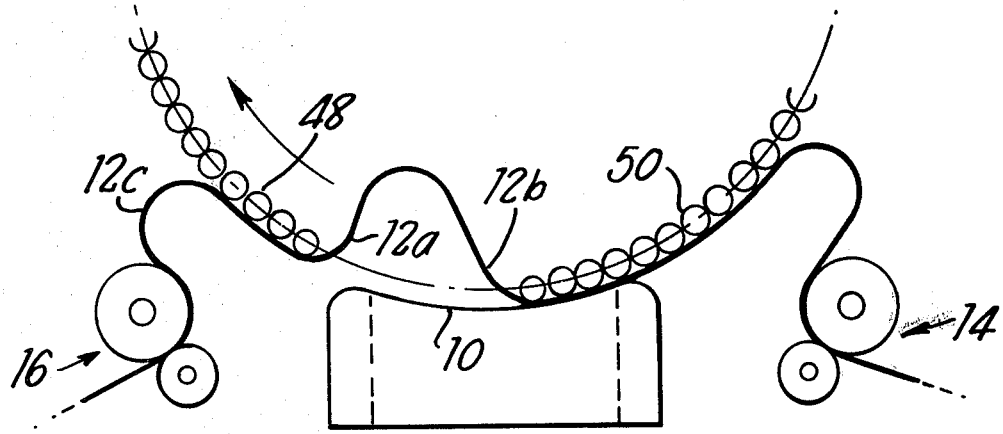

FIG. 6 shows a condition of the film at a time when the trailing rollers of group 48 and the leading rollers of group 50 are both in co-operative relationship with the surface 10. At this time, the enlarged loop made up of the film of portion 12a and the film of loop 12c is being moved leftwardly across the surface 10c, the film adjacent the two extremities of the enlarged loop being held stationary relative to the surface C by the trailing rollers of group 48 and the leading rollers of group 50. Eventually, when the roller group 48 has departed from the surface 10c, the film in this loop is transferred, as shown in FIG. 7 into the loop 12c while the film previously in loop 12b is gradually clamped against the surface 10 by the advancing rollers of group 50. During this time, a new loop 12b' is forming at the upstream side of the surface 10c, part of which new loop is urged, due to the resilience of the film, against the outer surface of the roller group 50. The film previously in loop 12b eventually becomes clamped and held stationary for recording an image thereon, in the same manner as shown in FIG. 4 and the cycle of operations illustrated in FIGS. 4 to 7 is repeated.

Since the rollers of the groups 46, 48 and 50 are effective to lay the film onto the surface 10c without causing the film to slide along the surface 10c, the relatively delicate emulsion on the lower surface of the film (as seen in the drawings) will not be damaged due to any such sliding. In this connection, it should be noted that just before the condition shown in FIG. 6 i.e. when the leading roller of group 50 first comes into co-operative relationship with the surface 10c, there may be a small amount of sliding of the film relative to the fibre optic block 10, such sliding may be of a portion of the film which is never exposed. I.e. a portion of the film between successive recorded images. Also, since the rollers are all caused to roll around the track 52, they also roll over the film while clamping it against the surface 10. Thus sliding movement between the film and the roller surfaces is avoided. Damage to the film due to sliding movement thereof in connection with a stationary guide surface may thus be substantially eliminated by this embodiment of the invention.

It will be recognized that in the embodiment of FIGS. 1 to 7, the spacing between the exposed portions of the film will be dependent upon the length of film fed into the loop 12b by the supply device 14 between the time at which the leading roller of successive groups comes into co-operative relationship with the surface 10c as shown in FIG. 6. Reducing this length of film will reduce the spacing between the exposed portions, whereas increasing this length of film will increase the spacing. Generally, therefore, the speed at which the device 14 supplies film may be chosen in such a way that wastage of film is minimised whilst avoiding any risk that the rate of supply should be so slow that overlapping images are produced on the film. The camera of FIGS. 1 to 7 is intended to take in rapid succession a series of still photographs and thus wide spacing between adjacent exposed portions is of no significance apart from matters of economy.

Figure 8:
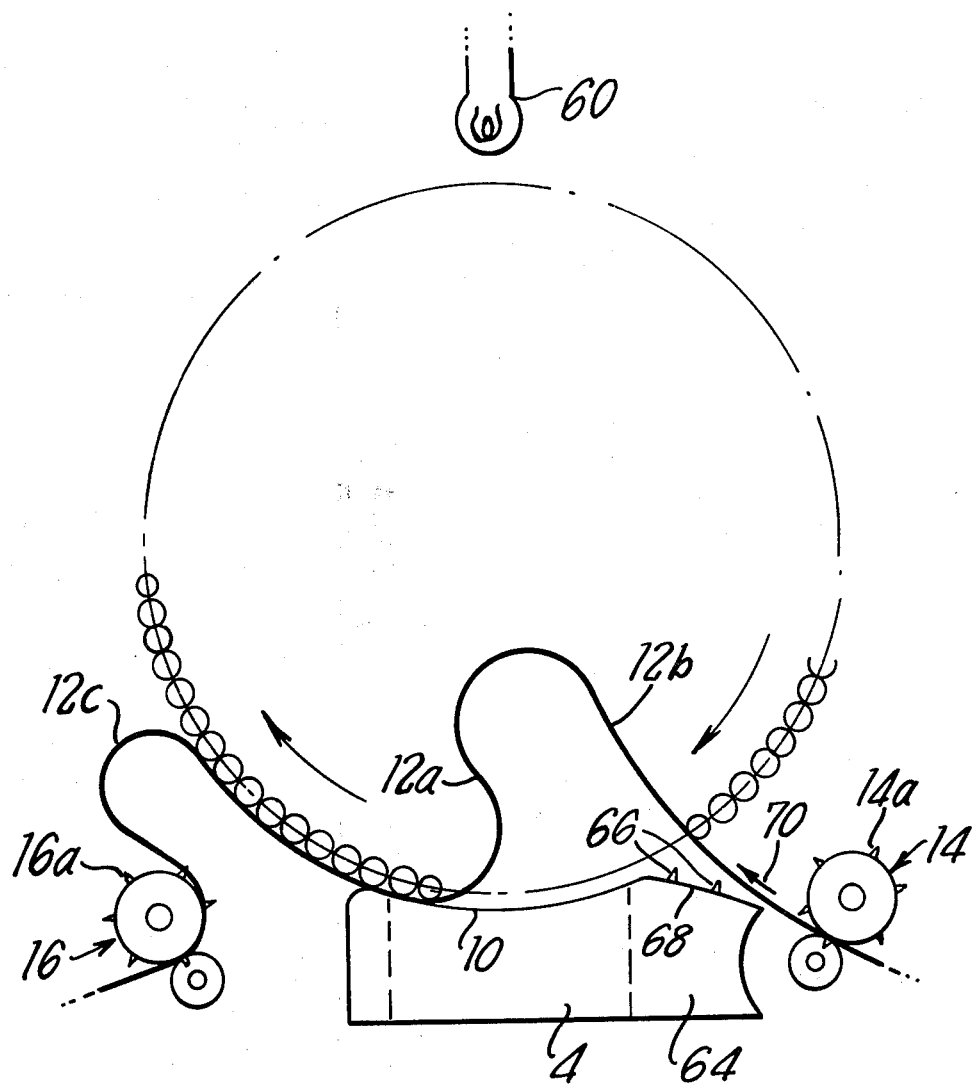
FIG. 8 is a diagram, similar to FIG. 5, but showing a modified embodiment of the present invention.
Figure 9:
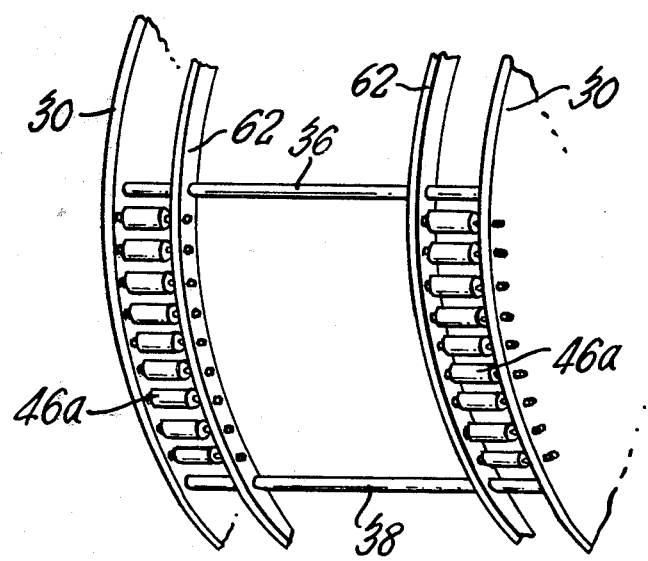
FIG. 9 is a perspective view, similar to FIG. 3, but showing part only of the rotor of the modified embodiment shown in FIG. 8.
Figure 10:
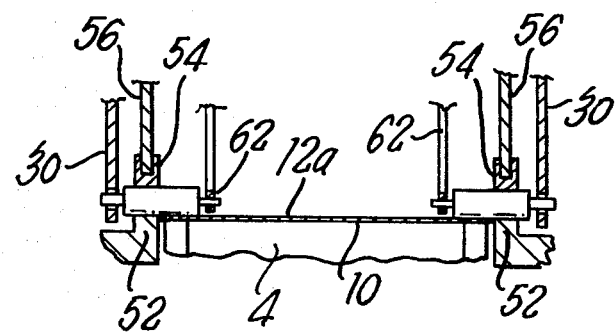
FIG. 10 is a section similar to FIG. 2, but showing part of the modified embodiment of the invention.
Figure 11:
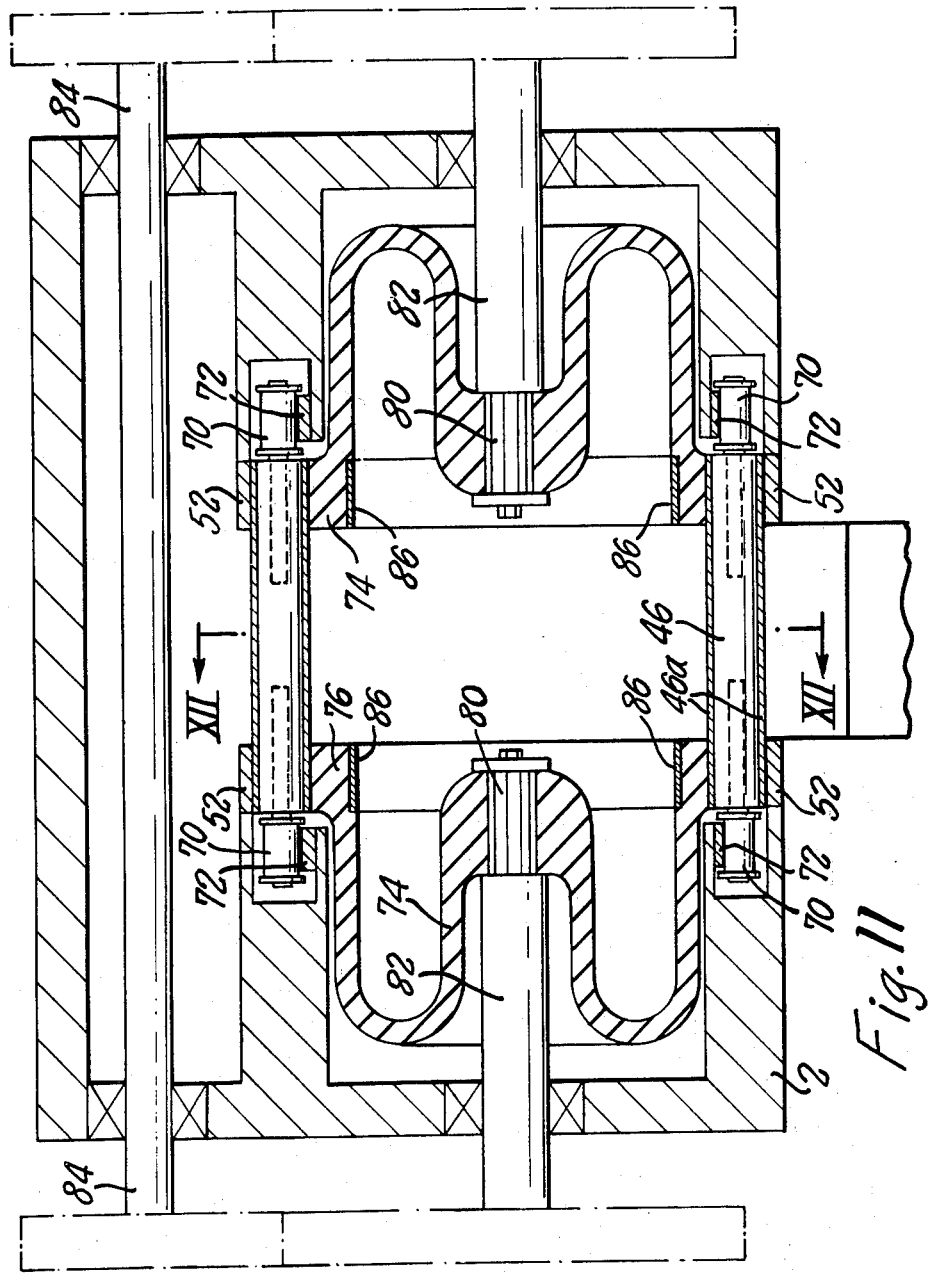
FIG. 11 is an axial section, similar to FIG. 2, but showing a further embodiment of the present invention.

However, when applying the invention to a movie camera or film projector it is important that the successive portions of the film which are held stationary should be closely spaced. FIGS. 8 to 10 illustrate an embodiment of the invention in a film projector. The mechanism is essentially the same as that described with reference to FIGS. 1 to 7, and therefore the following description will concentrate only the differences between the two mechanism. The block 4 is simply a transparent glass block instead of being a block of optical fibres, and the image intensifier and optical system is omitted and replaced by a conventional optical system and shutter (not shown) as used in film projectors for projecting, with the aid of a light source positioned above the rotor 18 and diagrammatically indicated at 60, an image of the picture recorded on the film onto a suitable screen (not shown). In order that the light from the source 60 is not interrupted by the rollers of groups 46, 48 and 50, the rollers in this embodiment do not extend between the two discs 30. Instead, as shown in FIG. 9 (which illustrates only the roller group 46) this is made up of two sets 46a. One end of each of the rollers in each set 46a is supported by the respective disc 30 and the opposite end is supported by a hoop 62 secured to the rods 36, 38, 40, 42 and 44, which hoops are thus secured relative to the disc 30. Although only part of each hoop 62 can be seen in FIG. 9, each hoop does form a complete circle and the other roller groups 48 and 50 are identical to the sets 46a. The rollers in the sets 46a are supported, as are the rollers in the first embodiment for limited radial movement and they are rotated in exactly the same manner, by the wheels 56. However, whereas the rollers in the first embodiment roll across the whole width of the film portion 12a, the rollers in the embodiment of FIGS. 8 to 10 roll along only the edge portions of the portion of the film 12a held against the surface 10, thus leaving the central portion unobscured for illumination by the light source 60.

To insure proper registration between each frame on the film and the surface 10, the block 4 is provided with an extension 64 carrying one or more pairs of pins 66 (one pin of each of two pairs is visible in the drawings) which are arranged to engage in the perforations conventionally provided along the edge of the film, and the supply and take-up devices 14 and 16 also comprise sprocket wheels having teeth 14a and 16a which engage in the perforations.

Thus, it is arranged that the feed device 14 supplies the film in such a way that perforations in the film are brought into registration with the pins 66 at just the right time to permit these pins to engage in the perforations as the film is brought into engagement with the upper surface 68 of the block 64. It will be recognized that since at this instant (i.e. a time shortly after the condition shown in FIG. 8), the loop 12b is still growing due to the continuing supply of film from the supply device 14, the portion of the film which engages with the pins 66 will be moving in the direction of arrow 70 (FIG. 8) to some extent, and thus, upon engagement of the pins, the film will be subjected to some stress. To avoid this stress, the drive for the supply device 14 is preferably operated at a cyclically varying speed such that, at the instant when the pins engage in the perforations in the film, the portion of the film with which the pins engage is virtually stationary. Alternatively, the pins 66 could be provided on a reciprocating member which moves along with the film in the direction of the arrow 68 during the period when the pins 66 are engaged with the film, and then slows down gradually to rest and stops at the required position to bring the required frame into register with the surface 10, for projection of the image. The reciprocating member will then be held stationary for a period sufficient to enable the portion of film engaged with the pins to be disengaged therefrom due to formation of the next loop 12b, and thereafter would be moved in the opposite direction in preparation for the next engagement operation between the pins and perforations in the film.

The embodiment illustrated in FIGS. 11 to 14 is a further example of application of the invention to a still camera. In this case, however, the roller groups 46, 48 and 50 are rotatably mounted on pins 71 attached to spaced apart chains 70, instead of to the discs 30. The pins 71 project well into the rollers to maintain the rollers parallel and with these axes normal to the chains 70. The chains 70 are supported on oval or oblate guides 72, and thus the endless path around which the roller groups 46, 48 and 50 move is of oval shape. The guides 72 are made of a suitable low-friction material such as nylon and are secured to the housing 2. The portion of the endless path which the roller groups move around is straight adjacent to the upper surface 10 of the fibre optic block 4, and consequently the surface 10 is plane. The tracks 52 which the rollers of the groups 46, 48 and 50 engage and roll around are also of oval shape, and belts 46a, 48a and 50a surround the respective groups so as to provide a continuous rolling surface co-operating with the surface 10 to clamp the film, and the provision of these belts makes it possible to use a fewer number of rollers in each group, since the rollers may be more widely spaced within each group than is required in the previous embodiments to ensure that the film is properly held without buckling. Instead of the wheels 56 and tyres 54, flexible drive members 74 are provided. The drive members are made of resilient rubber, preferably natural rubber of medium hardness, e.g. 50° IRHD, and in an unstressed condition, are circular as shown in FIG. 13. In cross-section, the drive members 74 are undulatory permitting them to be distorted from the shape shown in FIG. 13 to the oval shape shown in FIG. 12 and FIG. 14, in which oval shape, the peripheries 76 of the members 74 are held, due to the resilience of the rubber, in engagement with the belts 48a. The members 74 are coupled by a splined coupling 80 to respective drive shafts 82 which are interconnected by a transmission 84 which synchronizes the rotation of the two shafts 82, these shafts being driven by the motor 56, (not shown in FIGS. 11 to 14) for effecting rotation of the members 74 so that the peripheries cause the belts and roller groups to roll around the track 52. Metal resilient reinforcement 86 is provided around the insides of the peripheries 76 of the members 74 to assist in maintaining these peripheries in engagement with the belts and roller groups and inhibit axial movement of the peripheries 76 as successive portions thereof move radially during their travel around the curved portions of their path. The members 74 are slotted radially, as indicated by reference number 88 (the material between the slots 88 thereby effectively constitutes resiliently extendable and contractable spokes) to facilitate the movement of the successive portions of the periphery 76 towards the axis of the shafts 82 when the portions are approaching the straight part of the path, and away from the axis when the portions begin to go around the curved parts of the path i.e. as the members 74 rotate, each portion is alternately compressed (while going along the straight part of the path) and expanded (while going around the curved part of the path).

The embodiment of FIGS. 11 to 14 has the advantages that the portions of the film held stationary are in a plane, thus avoiding any risk of distortion of the image due to curvature of the film; the apparatus may be smaller than that of FIGS. 1 to 3; and the fibre optic block may be part of an image intensifier (image intensifiers including a fibre optic block being well known) thus avoiding the extra cost and loss of resolution arising from the provision of a separate fibre optic block.

Various modifications are possible within the scope of the invention. For example, in the embodiment of FIGS. 11 to 14, the drive means for causing the rollers to roll could simply be in the form of a pair of belts, instead of the udnulatory members 74. Such belts would be acting in exactly the same way as the peripheries 76 of the members 74, but of course a separate means would have to be provided to maintain them in the required operative position, and a suitable drive means provided for effecting rotation of these belts. Also, in the embodiment of FIGS. 11 to 14, the rods 36 have been omitted and thus the loop 12b is moved from the input side of the block to a position in alignment with the block 4 by direct engagement with the leading edge of the belt 46a, 48a or 50a which is of course rotating due to the rolling movement of the belt along the tracks 52. If desired, rods 36, 38 etc could be provided to avoid direct contact between the film and the rotating belts at the time of transfer of the film loop. Further, in the embodiment under discussion, it would be possible to dispense with the rollers of each group apart from the leading and trailing roller and instead to provide some other means such as a resiliently mounted plate, between such rollers for urging the belts towards the film portion being clamped.

In each of the embodiments illustrated with reference to the drawings, the length of the gap between successive roller groups has been less than the length of the support surface as measured in the direction of movement of the roller groups, it would be possible to provide an apparatus within the scope of the invention in which these gaps are of greater length than that of the support surface i.e. the surface 10c. However, if this is not preferred since when the gap is of smaller length than that of the surface 10c which supports the film, there is always at least one portion of the film held stationary with respect to the support surface, thus providing greater control over the movement of the film.

In the embodiments illustrated, the length of each roller groups has been greater than that of the support surface 10c as measured in the direction of movement of the roller groups. However, if for example it is only necessary to hold a portion of the film stationary in a zone which constitutes only a portion of the surface 10c, the length of the roller groups as measured in the direction of movement could be made less than the length of the support surface 10c. It is therefore possible within the scope of the invention that the support surface can be of greater expanse than the zone in which the film is to be held stationary.

Although, in the embodiments illustrated, there has been provided three roller groups with three gaps between them it would alternatively be possible, within the scope of the invention, to construct a device in which a greater or lesser number of clamping members. For example, in one such alternative embodiment, the rotor 18 could have one continuous group of rollers with just a single gap therein. Further, it is not essential that the surfaces of the clamping device which engage the back of the film should be adapted to roll across the film. Instead, a clamping device having, for example, a plush surface, such as of velvet, could be used to slide over the back surface of the film; or in another alternative, the clamping devices could comprise a leading and a trailing roller with a clamping member having a plush surface located between them.

Although the invention has been described as applied to cameras and projectors, the invention is also applicable to any system in which successive portions of a web are to be held stationary, for example for the carrying out of a printing or some other manufacturing operation on the web.

In the embodiment illustrated in FIGS. 1 to 7 it has been stated that the film supply mechanism 14 supplies the film at a constant speed. If desired, this could be arranged to supply the film at a cyclically varying speed, as in the embodiment of FIGS. 8 to 10, so that supply of film into the loop 12b ceases, or almost ceases, momentarily at the instant that the film is brought into engagement with the edge of the block 4 to minimise or eliminate the momentarily sliding movement of the film which would take place with respect to the block 4 as the film is brought into engagement with the block at a instant between the condition shown in FIG. 5 and that shown in FIG. 6.

Although it has been stated that when setting up the apparatus for operation, sufficient slack should be provided between the supply device 14 and take-up device 16 to enable formation of the various loops, and thereafter the supply and take-up devices and the rotor are all set into motion simultaneously, it would alternatively be possible to provide means whereby the rotor can be rotated while the supply and take-up devices are stationary. In this case, when setting the apparatus up, the loop 12b would be omitted i.e. the film between the supply device and the surface 10 would have little or no slack in it, but the loop 12c at the output side of the surface 10 would be provided. The rotor, but not the supply and take-up devices, would then be started up and the roller groups 46, 48 and 50 would simply roll across the surface 10 without causing any movement of the film. When it is desired to take a series of shots, the supply and take-up devices would be started up, and this would cause a loop 12b to be formed which, eventually, would project into one of the spaces between the roller groups and the cycle of operation described with reference to FIGS. 4 to 7 would then take place repeatedly. With this arrangement once the rotor is rotating at its operation speed, photography can begin at very short notice since it is not necessary to allow time for the inertia of the rotor to be overcome. Any of the embodiments illustrated may be modified and operated in this way if desired.

We claim:

1. A mechanism for transporting a web through a work zone and intermittently holding successive portions of said web stationary in said work zone, comprising:
   (a) a support member having a web support surface in said work zone;
   (b) clamping means including a plurality of clamping members spaced apart from each other to define a plurality of gaps, each of said clamping members including a clamping surface which is arranged to roll across said web at said work zone;
   (c) track means defining an endless path with which said clamping means are engaged and about which said clamping means are movable so that said clamping surfaces and said gaps alternately traverse said support surface, said clamping surfaces being adapted when traversing said support surface to hold portions of the web between the support and clamping surfaces stationary with respect to the support surface;
   (d) drive means operable to rotate said clamping members to cause said clamping members to roll along said track means to thereby cause said movement of said clamping members around said endless path;
   (e) supply means for supplying web to an input zone upstream of said support surface for forming a first loop of said web in said input zone, said clamping means being arranged to receive said first loop in said gap as said gap approaches said support surface and to transfer said loop across said support surface so that the portion of web previously clamped in said work zone is transferred to an input zone downstream of said support surface in the form of a second loop and web from said first loop is transferred into said work zone; and
   (f) take-up means for removing web from said second loop.

2. A mechanism according to claim 1, wherein said drive means comprises an endless drive member extending around said endless path and engaged with said clamping members, said endless member being rotatable upon operation of said drive means.

3. A mechanism according to claim 2, wherein said endless member is disposed inside said endless path and is rotatable in the direction of movement of the clamping devices around said path.

4. A mechanism according to claim 3, wherein said endless member is disposed in alignment with said track, portions of the clamping members thereby being located between said track and said endless member.

5. A mechanism according to claim 2, including a pair of said tracks, one at each side of said endless path, and a pair of said endless members, one at each side of said endless path.

6. A mechanism according to claim 2, wherein said path is circular.

7. A mechanism according to claim 6, comprising a wheel the periphery of which constitutes said endless member.

8. A mechanism according to claim 7, wherein said periphery carries an elastomeric tyre permitting limited radial movement of said clamping members.

9. A mechanism according to claim 2, wherein said endless path is of oval shape and comprises a resilient member having a periphery which constitutes said endless drive member, said drive means including drive shaft means connected to a central portion of each resilient member for effecting rotation thereof, said resilient member being arranged such that successive portions thereof alternatively expand and contract during rotation thereof whereby said periphery remains in engagement with said clamping members as said members move around said endless path.

10. A mechanism according to claim 9, wherein said resilient member comprises a plurality of resilient spokes providing for said alternate compression and expansion.

11. A mechanism according to claim 9, wherein said resilient member is, in an unstressed condition, circular and undulatory as seen in axial section to permit said alternate compression and expansion.

12. A mechanism according to claim 11, wherein said member is made of elastomeric material.

13. A mechanism according to claim 12, including a resilient metal reinforcing ring at the periphery of said member to inhibit relative axial movements between different portions of said periphery.

14. A mechanism according to claim 10, wherein said resilient member is made of elastomeric material, said elastomeric material having radial slots therein defining said spokes.

15. A mechanism according to claim 9, wherein said supply means is operable at cyclically varying speed, such that the rate of supply of web is at least decreased when the clamping surface is coming into co-operative relationship with said surface of said support member.

16. A camera having a film transport mechanism according to claim 9, said work zone being a zone at which images are recorded on said film.

17. A camera according to claim 16, including a fibre optic device having a surface defining said work zone and operable for transmitting images to said zone.

18. A mechanism for transporting a web through a work zone and holding successive portions of said web stationary in said work zone during intermittent work periods, comprising:
 (a) a support member having a web support surface in said work zone;
 (b) clamping means having a clamping surface and at least one gap therein;
 (c) means for moving said clamping means around an endless path so that said clamping surface said clamping surface traversing said support surface during said work periods and said gap traversing said support surface during intervening periods and said gap alternately traverse said support surface, said clamping surface being adapted when traversing said support surface to cooperate with said support surface to clamp a portion of the web therebetween to thereby hold said web portion stationary with respect to said support surface, said clamping surface having a length in the direction of movement of the clamping member not less than the length of said work zone in said direction so that said clamping is effective throughout each of said work periods;
 (d) supply means for supplying web to an input zone upstream of said support surface for forming a first loop of said web in said input zone, said clamping means being arranged to receive said first loop in said gap as said gap approaches said support surface and to transfer said loop across said support surface so that the portion of web previously clamped in said work zone is transferred to an input zone downstream of said support surface in the form of a second loop and web from said first loop is transferred into said work zone; and
 (e) take-up means for removing web from said second loop.

19. A mechanism according to claim 18, wherein at least a portion of said clamping surface is arranged to slide over said web at said work zone.

20. A mechanism according to claim 19, wherein at least said portion of said clamping surface is of plush material.

21. A mechanism for transporting a web through a work zone and intermittently holding successive portions of said web stationary in said work zone, comprising:
 (a) a support member having a web support surface in said work zone;
 (b) clamping means having a clamping surface and at least one gap therein;
 (c) track means defining an endless path around which said clamping means is movable, said clamping means being in rolling engagement with said track means;
 (d) drive means operable to rotate said clamping means to cause said clamping means to roll along said track means thereby causing said clamping means to move around said endless path so that said clamping surface and said gap alternately traverse said support surface, said clamping surface being adapted when traversing said support surface to roll over portions of the web between the support and clamping surfaces to hold said web portions stationary with respect to the support surface;
 (e) supply means for supplying web to an input zone upstream of said support surface for forming a first loop of said web in said input zone, said clamping means being arranged to receive said first loop in said gap as said gap approaches said support surface and to transfer said loop across said support surfaace so that the portion of web previously clamped in said work zone is transferred to an output zone downstream of said support surface in the form of a second loop and web from said first loop is transferred into said work zone; and (f) take-up means for removing web from said second loop.

22. A mechanism according to claim 18, wherein the length of said gap is less than the length of said support surface as measured in the direction of movement of said clamping means.

23. A mechanism according to claim 21, wherein said clamping means comprises a plurality of clamping members spaced apart from each other to define a plurality of said gaps.

24. A mechanism according to claim 23, wherein the length of the clamping surface of each said clamping member, in the direction of movement thereof, is greater than the length of said work zone.

25. A mechanism according to claim 23, comprising a rotor on which said clamping members are mounted and which maintains said spacing between said clamping members.

26. A mechanism according to claim 25, wherein said rotor comprises first and second rigid members located respectively at opposite sides of said endless path, and means of securing said rigid members to each other.

27. A mechanism according to claim 25, comprising drive means for driving said clamping members to cause said rolling of said surfaces, said drive means comprising a drive shaft coupled to said endless member for effecting rotation thereof and said rotor being concentric with said drive shaft but rotatable relative thereto.

28. A mechanism according to claim 23, wherein each said clamping member comprises a group of rollers said clamping surface being constituted by the surfaces of said rollers.

29. A mechanism according to claim 23, wherein each said clamping member comprises a endless belt and a plurality of rollers supporting said belt for rotation, said clamping surface being constituted by the surfaces of said endless belts.

30. A mechanism according to claim 29, wherein said endless path is of oval shape.

31. A mechanism according to claim 30, including first and second chains disposed on opposite sides of said endless path and connected to said clamping members, and including guide means supporting each of said chains and defining said path.

32. A mechanism according to claim 21, wherein said supply means is operable at cyclically varying speed, such that the rate of supply of web is at least decreased when the clamping surface is coming into co-operative relationship with said surface of said support member.

33. A mechanism according to claim 32, including locator means disposed adjacent said surface of said support member for locating selected portions of said web in register therewith.

34. A mechanism according to claim 21, including locator means disposed adjacent said surface of said support member and engageable with said web to locate selected portions of said web in register with said support surface, said locator means being movable with said web during engagement of the locator means with the web.

35. A camera having a film transport mechanism according to claim 21, said work zone being a zone at which images are recorded on said film.

36. A camera according to claim 35, including a fibre optic device having a surface defining said work zone and operable for transmitting images to said zone.

37. A film projector including a film transport mechanism according to claim 21, said work zone being a zone at which frames of said film are located for projection.

38. A mechanism for transporting a web through a work zone and intermittently holding portions of said web stationary in said work zone comprising:
track means defining an endless path;
a clamping member arranged for movement around said path and located in rolling engagement with said track means;
drive means for rotating said clamping member to cause it to roll along said track means and thereby move around said endless path;
support means including a web support surface located adjacent a portion of said endless path and defining said work zone; and
web supply means and take-up means arranged respectively to supply web to and remove web from input and output zones at opposite sides of said work zone;
said mechanism being operable such that, each time said clamping member moves around said path, said clamping member successively moves a portion of said web supplied by said supply means into contact with said support surface, holds said portion in contact with said surface and releases said portion to permit a fresh portion of the web to be moved into contact with, held against and replaced from said surface.

39. A mechanism according to claim 38, wherein said clamping member comprises a group of closely spaced rollers.

40. A mechanism according to claim 38, wherein said clamping member comprises an endless flexible member.

41. A mechanism according to claim 40, wherein said endless flexible member is mounted on a plurality of rollers.

42. A mechanism according to claim 38, including a plurality of said clamping members mounted at spaced apart positions in said endless path and defining gaps between said clamping members.

* * * * *

UNITED STATES PATENT AND TRADEMARK OFFICE
CERTIFICATE OF CORRECTION

PATENT NO. : 4,180,194
DATED : December 25, 1979
INVENTOR(S) : Alan K. McCombie and Stephen Temple It is certified that error appears in the above–identified patent and that said Letters Patent are hereby corrected as shown below:

Claim 18, line 10, after "surface", delete "said clamping surface traversing said support surface during said work periods and said gap traversing said support surface during intervening periods", and insert same on line 15, before "said", and add a comma after "periods" at the second occurrence.

Signed and Sealed this

*First* Day of *April 1980*

[SEAL]

*Attest:*

*Attesting Officer*

SIDNEY A. DIAMOND

*Commissioner of Patents and Trademarks*